Sept. 30, 1969  J. A. GRICHNIK ET AL  3,469,903

NYSTAGMUS GONIOSCOPE

Filed March 22, 1967

Connected in motor circuit

Connected in motor circuit

JAMES GRICHNIK
ALBERT KUPFERSCHMIDT
INVENTORS

BY Louis Mok

ATTORNEY

3,469,903
Patented Sept. 30, 1969

3,469,903
NYSTAGMUS GONIOSCOPE
James A. Grichnik, Park Ridge, and Albert Kupferschmidt, Chicago, Ill., assignors to Beckman Instruments, Inc., a corporation of California
Filed Mar. 22, 1967, Ser. No. 625,242
Int. Cl. A61b 3/02
U.S. Cl. 351—1                       10 Claims

ABSTRACT OF THE DISCLOSURE

An apparatus for stimulating eye movement in which an endless, opaque belt, having at least one narrow slit across its width, is moved either continuously or in an oscillatory fashion inside a light-tight housing having a front panel provided with a horizontal elongated opening. A light source inside the housing causes a light spot to appear in the moving aperture defined by the elongated opening and the slit.

---

The present invention relates generally to an aparatus used to stimulate eye movement for testing for symptoms of visual disorders.

In the technique of electronystagmography, electrodes applied to the subject's forehead and outer canthi sense the corneo-retinal potential which is suitably recorded for analysis. When the subject's eyes move, the change in magnitude of the corneo-retinal potential causes a change in the voltage detected by the surface electrodes in the plane of the eye movement. This technique provides a useful tool in analyzing either spontaneous or induced nystagmus by measuring eye position, movement and velocity.

Nystagmus gonioscopes, that is, instruments used to stimulate and record eye movements to test for visual disorders such as deficiencies in eye muscular coordination, optic nerve disturbances, etc., are already well known. One such instrument comprises a continuously rotating element called an optokinetic drum for producing a ramp or sawtooth corneo-retinal potential trace resulting from the subject's eyes following successive light images produced by the drum. Another instrument universally used for diagnosis and calibration is simply a string pendulum which is set into motion a given distance in front of the subject's eyes. Here, the movement of the subject's eyes produces an approximate sinusoidal corneo-retinal potential variation.

The present apparatus combines the aforedescribed instruments and their functions in a unique fashion thereby eliminating the need for searate instruments. Besides providing the practitioner with the standard sawtooth function, the present apparatus is selectively operable to provide a light spot having a horizontal, oscillatory motion with a vertical component to approximate pendulum motion, eliminating, however, the decay of the period associated with an actual pendulum.

The novel features which are believed to be characteristic of the invention are set forth with particularity in the appended claims. The invention itself, however, together with further objects and advantages thereof can best be understood by reference to the following description taken in connection with the accompanying drawings in which:

Figure 1:
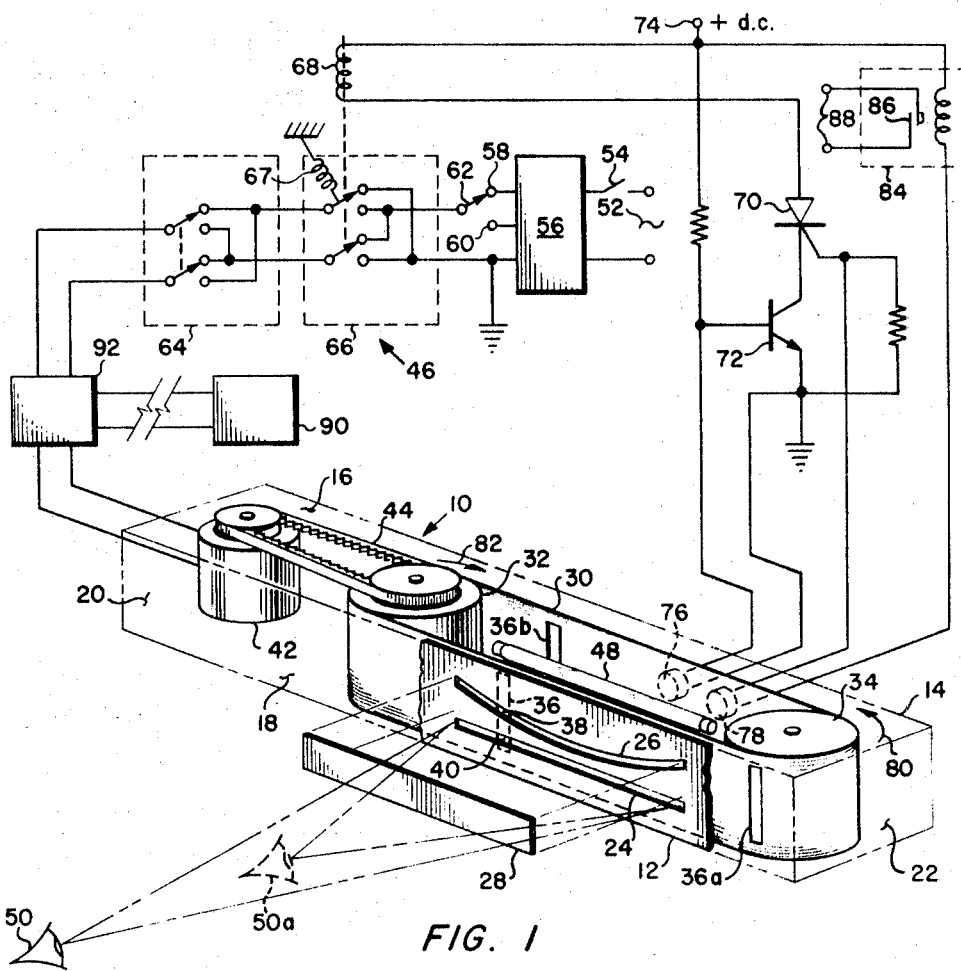
FIG. 1 is a perspective view of an apparatus embodying the features of the present invention and including an electronic switching means for controlling motor direction.

Turning now to the drawings, and in particular FIG. 1, the reference numeral 10 designates a generally rectangular, light-tight housing shown partially in phantom and having front and rear walls 12, 14, top and bottom walls 16, 18 and opposing end walls 20, 22. The front wall 12 is provided with a pair of horizontally oriented, elongated openings 24 and 26. The lower opening 24 is preferably a substantially rectangular slot. Since only one opening will be in use at any given time, a mask, such as the plate 28, is secured over the unused opening. The opening 26 has a curved shape to provide the traveling light spot with both a horizontal and a vertical component of motion. The shape of the curve preferably approximates that of a sine wave. When the eye follows a light spot traveling along the curved opening, the corneo-retinal potential trace produced is nearly the same as that produced if a simple pendulum were used.

Disposed inside the housing 10 is an opaque, endless belt 30 looped about a pair of axially vertical drums 32 and 34, crowned to keep the belt centered. The belt 30 has at least one narrow slit 36 formed across a portion of its width. In the preferred embodiment depicted in FIG. 1, the belt 30 is provided with three slits, 36, 36a and 36b equally spaced around the circumference of the belt. In this way, as will be explained in greater detail below, a close approximation to the desired corneo-retinal potential sawtooth pattern will be generated and a light spot can be oscillated across the openings 24 and 26 without disappearing from view.

The drums 32 may be supported in any suitable manner, for example, by journaling the drum spindles in appropriate bearings secured to the top and bottom walls 16 and 18. The drums 32 and 34 are positioned so that a straight course of the belt 30 travels along the inner surface of the front wall 12 proximate the portion of the wall having the openings 24 and 26. As a result, the slits 36, 36a and 36b, in cooperation with the openings 24 and 26, define apertures 38 and 40 which traverse the openings 24 and 26 as the belt moves.

Suitable means, which may take the form of a conventional, reversible D.C. electric motor 42, is provided to rotatably drive the drum 32. The motor 42 may be coupled to the drum 32 in any desired manner; a notched belt drive 44 is shown by way of example in the embodiment of FIG. 1. The motor 42 is energized by a power supply and switching system 46 which will be described more fully below.

Inside the belt loop 30, mounted on the bottom wall between the drums 32 and 34, is a light source 48. The light source 48 is preferably in the form of an elongated bulb or tube so that uniform light intensity is transmitted through the apertures 38 and 40 irrespective of the position of the slits along the openings 24 and 26.

It will be readily seen that the direction of travel and the horizontal velocity of the light spot appearing at the apertures 38 and 40 are controlled by the direction and velocity of the belt 30. If the belt is continuously moved in one direction, a light spot will appear to the eye 50 to travel across the unmasked opening from one extremity to the other. For a given opening length in conjunction with appropriate spacing between the slits 36, 36a and 36b, a light spot will come into view at one end of the opening just as the preceding light spot disappears from view at the other end. The eye, following the motion of the successive light spots across the opening, causes a sawtooth pattern to be traced by the instrument recording the corneo-retinal potential. With the subject placed closer to the front panel of the apparatus, such as at the position designated by the reference numeral 50a, the angular velocity of the eye is caused to increase.

As already stated, it is also desirable to obtain a corneo-retinal potential trace corresponding to eye movement resulting from following an oscillating object or light spot. This may be accomplished with the apparatus of the present invention by periodically reversing the direction of the belt so that the light spot is caused to travel back and forth across the opening without disappearing from view. A suitable motor power supply and reversing arrangement will now be described.

Electrical power from an A.C. source 52 is applied through an on-off switch 54 to and A.C.-D.C. converter 56. A number of D.C. voltage taps, for example, 58 and 60 are provided at the converter output for furnishing various voltage levels; by selecting the desired voltage level by means of the switch 62, the speed of the motor may be controlled. Between the converter output and the D.C. motor 42 are a pair of double-pole, double-throw switches 64 and 66 permitting manual or automatic reversal of the belt direction. The first of these switches, 64, is a manual switch, mounted on the front panel 12 for actuation by the operator. The second switch, 66, is a relay switch, biased by a spring 67 to one of its two positions and is operable, for example, by an electronic switching circuit shown in FIG. 1.

The coil 68 of the relay switch 66, a silicon controlled rectifier (SCR) 70 and an NPN transistor 72 are serially connected between a terminal 74, coupled to a suitable D.C. power supply (not shown) and ground potential. A pair of photocells 76 and 78 are mounted inside the housing 10 on the rear wall 14 adjacent the outer surface of the belt 30. The photocells 76 and 78 are thereby in a position to receive light from the source 48 when any of the slits 36, 36a or 36b moves in front of the particular photocell. The photocell 76 is connected across the base-emitter electrodes of the transistor 72 and the cell 78 is coupled to the gate circuit of the SCR 70.

In operation, assume the transistor 72 to be normally "on," that is, forward biased and the SCR 70 normally off. With the SCR off, no current flows through the relay coil 68. Assuming that the belt is traveling in the direction indicated by the arrow 80, the light slit 36a will eventually traverse the distance to the position of photocell 78. As soon as light strikes the photocell 78 through the slit 36a, the gate of the SCR 70 is pulsed to turn the SCR on. The circuit between the power supply and ground is now closed thereby energizing the coil 68 to move the relay switch 66 to its other position. The motor reverses and the belt thereupon begins to move in the direction indicated by the arrow 82. It will continue in this direction until the slit 36b is interposed between the light source 48 and the photocell 76. When this occurs, the transistor is momentarily reverse-biased thereby turning off the SCR and preventing further current flow through the coil 68. With the coil de-energized, the switch 66 snaps back to its original position, once again reversing the direction of the motor. Since it is a characteristic of an SCR to remain off until its gate is pulsed once again, the belt will continue in the direction indicated by arrow 80 until the light slit 36a is once again in a position to permit light to fall on the photocell 78.

With the addition of several components, the apparatus may be used for "optical tracking." In this technique, the subject follows the moving light spot and a comparison is made between the position of his eyes (as sensed by the electrodes applied to the subject's head) and the actual position of the spot at a given instant. Thus, the delay or response time of the subject's optic system can be measured. This is especially useful for screening people for industrial employment requiring optical dexterity.

The actual horizontal position of the light spot along the opening 24 or 26 is obtained by energization of a suitable switch means, such as the reed relay switch 84 having contacts 86, connected in the line coupling the photocell 78 and the coil 68. The output terminals 88 of the switch 84 are connected to an event recorder on the nystagmograph. Thus, each time one of the slits 36, 36a or 36b passes the cell 78, the reed relay will be energized, shorting out the contacts 86 and thereby triggering the event recorder.

Further, in connection with the provision of the "optical tracking" capability, a remote controller 90 may be added for use by the operator to open and close the motor supply circuit or reverse the polarity and hence the direction of the motor. The controller 90 includes a push button and a suitable polarity reversing switch for accomplishing the foregoing. By pressing the push button to close the circuit, the operator can index the light spot to any desired position and by operating the reversing switch, motor direction can be remotely reversed. A suitable connector 92 is included in the motor circuit for connection to the controller 90. The circuit details of the controller 90 and connector 92 have not been shown as these will be immediately apparent to those skilled in the electrical arts.

Figure 2:
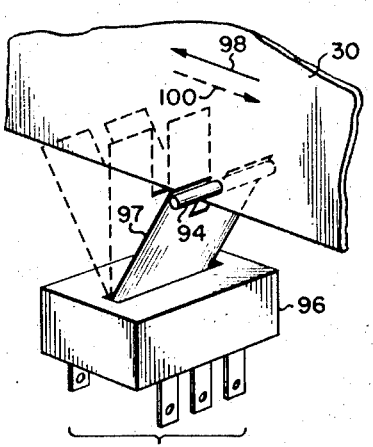
FIG. 2 is a perspective view of a portion of the instrument of FIG. 1 showing an alternative switching arrangement.

Turning now to FIG. 2, there is shown an alternate arrangement for reversing the direction of the motor. Three pins 94, (of which one is shown) are attached to the belt so that their ends project normally from both surfaces of the belt. The drums 32 and 34 will, of course, have to be suitably grooved to accommodate the pins 94, as the belt moves. Located below the lower edge of the belt is a double-pole double-throw switch 96 having a bifurcated actuating arm 97 which straddles the lower portion of the belt 30 so as to be engaged by the pins 94. The switch 96, which would be used in the motor circuit in place of the switch 66 and the electronic control circuit, is of the type in which the actuating arm will be either at one extreme of its travel or the other. When the actuating arm is moved from one extreme position across dead center, it will immediately snap to the other position. Thus, with the belt traveling in the direction indicated by the solid arrow 98, one of the pins 94 will eventually engage the arm 97 and move it to the center position from where it will snap to the extreme left. With the motor reversed and the belt running in the direction of the broken arrow 100, another pin will come along to move the actuating arm to its initial position to again reverse the motor direction.

Figure 3:
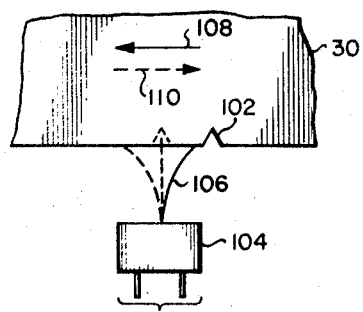
FIG. 3 is a side view of a portion of the apparatus of FIG. 1 showing yet another switching arrangement.

FIG. 3 shows yet another switching arrangement similar to that of FIG. 2. In this embodiment, a plurality of spaced notches 102 (only one of which is shown) are provided in the lower edge of the belt 30. A double-pole double-throw switch 104 of the type described above is mounted below the lower edge of the belt 30 and has a flexible arm 106 which bears lightly against the lower edge of the belt. With the belt traveling in the direction of the solid arrow 108, a notch 102 comes along and moves the arm 106 from its initial position (shown as a solid line) to the center position from where the arm snaps over to the extreme left hand position. The motor direction of rotation is thereby reversed and the belt will run in the opposite direction (indicated by broken arrow 110) until another notch 102 picks up the arm 106 to flip it back to its initial position.

Other switching arrangements will suggest themselves to those skilled in the art. For example, small magnets can be attached to the belt surface to operate magnetic reed switches mounted proximate the belt.

It will be obvious to those skilled in the art that various modifications may be made to the specific exemplary embodiments of the invention described.

What is claimed is:
1. In a nystagmus gonioscope for testing for symptoms of eye disorders, the combination comprising
   a light-tight housing including opposing front and rear walls and opposing top and bottom walls, said front wall having a horizontal, elongated opening;
   an opaque, endless belt loop inside said housing, said belt including at least one narrow slit across a portion of the width thereof;

axially vertical drums journaled between said top and bottom walls movably supporting said belt so that a straight course of said belt loop lies immediately adjacent the inside surface of said front wall, said slit and said elongated opening thereby defining a small aperture;

a light source mounted between said drums within said belt loop; and means for moving said belt whereby a light spot, appearing at said aperture, is seen by an observer to travel along the opening in said front wall.

2. Apparatus as defined in claim 1 in which said horizontal, elongated opening has a substantially linear, rectangular shape.

3. Apparatus as defined in claim 1 in which the shape of said horizontal, elongated opening is substantially that of a portion of a sine wave.

4. Apparatus as defined in claim 1 in which said means for moving said belt includes control means selectively operable to periodically reverse the direction of said belt to cause said light spot to oscillate across said opening in said front wall.

5. Apparatus as defined in claim 4 in which said belt moving means includes a D.C. electric motor; and said control means includes sensor means cooperating with said belt to periodically reverse the polarity of the voltage input to said motor.

6. Apparatus as defined in claim 5 in which said D.C. motor input includes a polarity reversing relay switch biased to a first of two positions;

said sensor means includes a pair of photocells mounted in spaced-apart relation in said rear wall of said housing for receiving light from said source through said slit; and said control means further includes the series combination of a power supply, a coil for operating said relay switch, an SCR and a transistor, the first of said photocells connected to the gate circuit of said SCR, the second of said photocells connected across the base-emitter electrodes of said transistor, said transistor being normally forward biased, said SCR being normally off, said relay coil being thereby de-energized, whereby, with said belt traveling in one direction, the light impinging upon said first photocell through said slit pulses the gate of said SCR to turn said SCR on and latch same and thereby energize said relay to reverse said belt direction until light impinges through said slit upon said second photocell to momentarily reverse-bias said transistor thereby turning off said SCR, deenergizing said relay and again reversing the direction of said belt.

7. Apparatus as defined in claim 4 in which said means for moving said belt includes a D.C. motor connected to drive said belt and a two position, polarity reversing switch in the motor input circuit, said switch having a bifurcated actuating arm straddling said belt;

and which includes at least one pin carried by said belt, said pin projecting from said belt surface to contact and displace said actuating arm from one switch position to the other switch position to reverse the polarity of the voltage applied to said motor.

8. Apparatus as defined in claim 4 which includes at least one notch formed in one of the edges of said belt;

and in which said means for moving said belt includes a D.C. motor connected to drive said belt and a two position polarity reversing switch having an actuating arm riding in contact along said edge of said belt, said notch engaging said actuating arm to move said arm from one switch position to the other switch position to reverse the polarity of the voltage applied to said motor.

9. Apparatus as defined in claim 1 in which said means for moving said belt includes a D.C. motor coupled to drive said drums and a remote controller connected in the motor input circuit and including first switch means for opening and closing said motor circuit to permit indexing said belt and second switch means for reversing the polarity of said motor input to permit reversal of said belt direction.

10. Apparatus as defined in claim 1 in which said front wall of said light tight housing includes a second horizontal, elongated opening and comprising in addition a movable mask cooperating with said front wall of said light tight housing, said movable mask being selectively adjustable to permit the light spot to be visible to an observer through only one of said elongated openings at a time.

References Cited
UNITED STATES PATENTS

| | | | |
|---|---|---|---|
| 3,284,154 | 11/1966 | Friedmann | 351—23 |
| 2,819,544 | 1/1958 | Yoshioka | 40—32 |
| 3,005,550 | 10/1961 | Flanders et al. | |
| 3,065,355 | 11/1962 | Barnes. | |
| 3,115,289 | 12/1963 | Namenyi-Katz. | |
| 3,341,275 | 9/1967 | Haugen | 351—30 |

OTHER REFERENCES

Raymond Dodge et al., The Angle Velocity of Eye Movements, Psychological Review, vol. 8, pp. 145–157.

On the Line of Sight, Design, pp. 24–31, April, 1959.

DAVID SCHONBERG, Primary Examiner

P. A. SACHER, Assistant Examiner

U.S. Cl. X.R.
40—32; 351—36, 37